(12) United States Patent
Xie et al.

(10) Patent No.: US 11,397,088 B2
(45) Date of Patent: Jul. 26, 2022

(54) SIMULTANEOUS LOCALIZATION AND MAPPING METHODS AND APPARATUS

(71) Applicant: Nanyang Technological University, Singapore (SG)

(72) Inventors: Lihua Xie, Singapore (SG); Chen Wang, Singapore (SG); Junsong Yuan, Singapore (SG)

(73) Assignee: Nanyang Technological University, Singapore (SG)

( * ) Notice: Subject to any disclaimer, the term of this patent is extended or adjusted under 35 U.S.C. 154(b) by 295 days.

(21) Appl. No.: 16/329,118

(22) PCT Filed: Sep. 7, 2017

(86) PCT No.: PCT/SG2017/050446
§ 371 (c)(1),
(2) Date: Feb. 27, 2019

(87) PCT Pub. No.: WO2018/048353
PCT Pub. Date: Mar. 15, 2018

(65) Prior Publication Data
US 2019/0226852 A1 Jul. 25, 2019

(30) Foreign Application Priority Data

Sep. 9, 2016 (SG) .......................... 10201607539W

(51) Int. Cl.
*G01C 21/32* (2006.01)
*G06T 7/20* (2017.01)
(Continued)

(52) U.S. Cl.
CPC ........... *G01C 21/32* (2013.01); *G01C 21/165* (2013.01); *G05D 1/024* (2013.01); *G05D 1/027* (2013.01);
(Continued)

(58) Field of Classification Search
CPC ...... G01C 21/32; G01C 21/165; G05D 1/024; G05D 1/027; G05D 1/0274; G06T 7/20;
(Continued)

(56) References Cited

U.S. PATENT DOCUMENTS

2009/0232388 A1* 9/2009 Minear ................. G06T 3/0075
382/154

FOREIGN PATENT DOCUMENTS

WO 2018048353 A1 3/2018

OTHER PUBLICATIONS

Examiner annotated version of: Andrew J. Davison et al., MonoSLAM: Real-Time Single Camera SLAM, Jun. 2007, IEEE, vol. 29, No. 6, 1052-596 (Year: 2007).*

(Continued)

*Primary Examiner* — Tyler J Lee
*Assistant Examiner* — Yufeng Zhang

(57) ABSTRACT

A simultaneous localization and mapping method and corresponding system are disclosed. The method comprises: receiving a frame of three dimensional point cloud data from a three dimensional point cloud sensor coupled to a robot; receiving inertial measurement data indicative of a change in pose of the three dimensional point cloud sensor; using the inertial measurement data to estimate a rotation between the received frame of three dimensional point cloud data and a key frame of three dimensional point cloud data; applying a rotation to the received frame of three dimensional point cloud data to obtain an aligned frame of three dimensional point cloud data, the aligned frame of three dimensional point cloud data having an orientation aligned with the key frame of three dimensional point cloud data; and estimating a translation of the aligned frame of three dimensional point cloud data from the key frame of three dimensional point cloud data.

20 Claims, 12 Drawing Sheets

(51) Int. Cl.
*G05D 1/02* (2020.01)
*G06T 15/00* (2011.01)
*G01C 21/16* (2006.01)

(52) U.S. Cl.
CPC .............. *G05D 1/0274* (2013.01); *G06T 7/20* (2013.01); *G06T 15/00* (2013.01); *G06T 2207/10028* (2013.01); *G06T 2207/10032* (2013.01)

(58) Field of Classification Search
CPC ........... G06T 15/00; G06T 2207/10028; G06T 2207/10032
See application file for complete search history.

(56) References Cited

OTHER PUBLICATIONS

Examiner annotated version of: Joao F. Henriques et al., High-Speed Tracking with Kernelized Correlation Filters, Mar. 2015, IEEE, vol. 37, No. 3, 583-596 (Year: 2015).*
Examiner annotated version of: David S. Bolme et al., Visual Object Tracking using Adaptive Correlation Filters, Aug. 2010, IEEE, 978-1-4244-6985-7/10, 2544-2550 (Year: 2010).*

Foreign Communication from a Related Counterpart Application, International Search Report and Written Opinion dated Nov. 27, 2017, International Application No. PCT/SG2017/050446 filed on Sep. 7, 2017.
Davison, A. J. et al., MonoSLAM: Real-Time Single Camera Slam. IEEE Transactions on Pattern Analysis and Machine Intelligence, Jan. 18, 2007, vol. 29, No. 6, pp. 1052-1067 [Retrueved on Oct. 19, 2017] <DOI: 10.1109/TPAMI.2007.1049>.
Mourikis, A. I. et al., A Multi-State Constraint Kalman Filter for Vision-aided Inertial Navigation. 2007 IEEE International Conference on Robotics and Automation, May 21, 2007, pp. 1-20 [Retrieved on Oct. 19, 2017] <DOI: 10.1109/ROBOT.2007.364024>.
Pretto, A. et al., A visual odometry framework robust to motion blur. IEEE International Conference on Robotics and Automation, 2009*, May 17, 2009, pp. 2250-2257 [Retrieved on Oct. 19, 2017] <DOI: 10.1109/ROBOT.2009.5152447>.
Henriques, J. F. et al., High-Speed Tracking with Kemelized Correlation Filters. IEEE Transactions on Pattern Analysis and Machine Intelligence, Aug. 1, 2014, vol. 37, No. 3, pp. 583-596 [Retrieved on Oct. 19, 2017] <DOI: 10.1109/TPAMI.2014.2345390>.
Bolme D. S. et al., Visual Object Tracking Using Adaptive Correclation Filters, 2010 IEEE Conference on Computer Vision and Pattern Recognition (CVPR), Aug. 5, 2010, pp. 2544-2250 [Retrieved on Oct. 19, 2017] <DOI: 10.1109/CVPR.2010.5539960>.

* cited by examiner

FIG. 4A
FIG. 4B
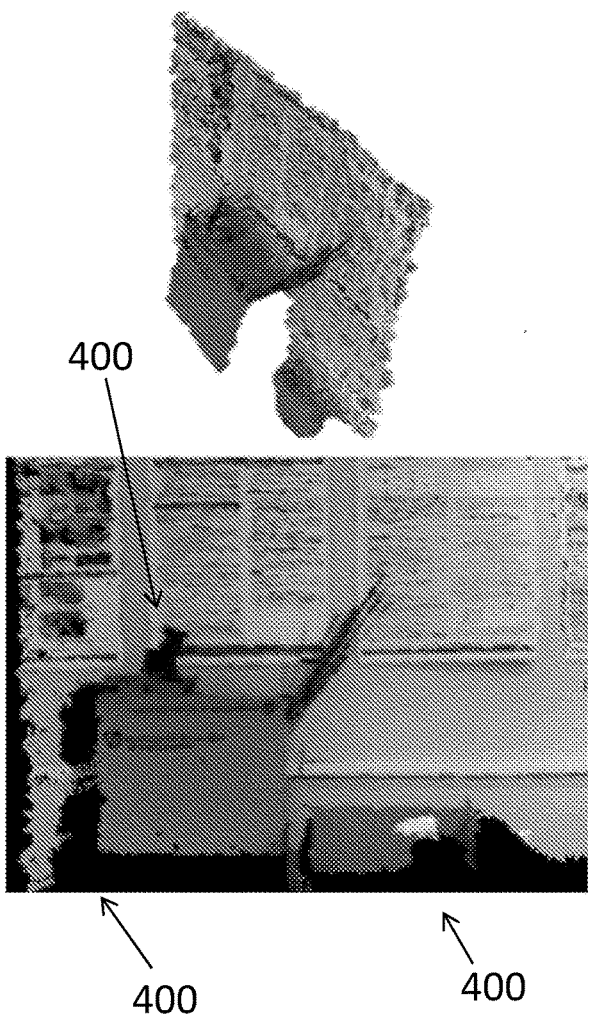
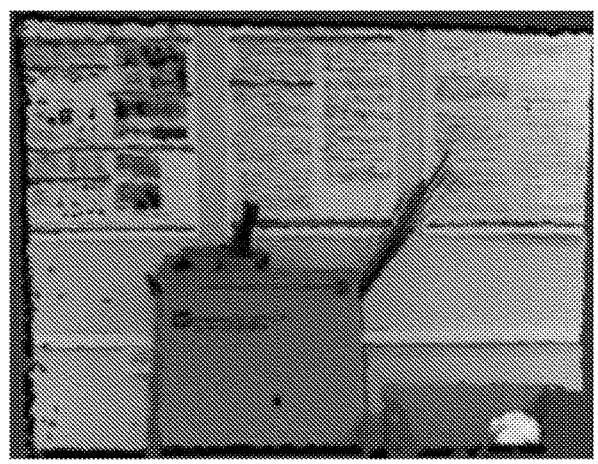
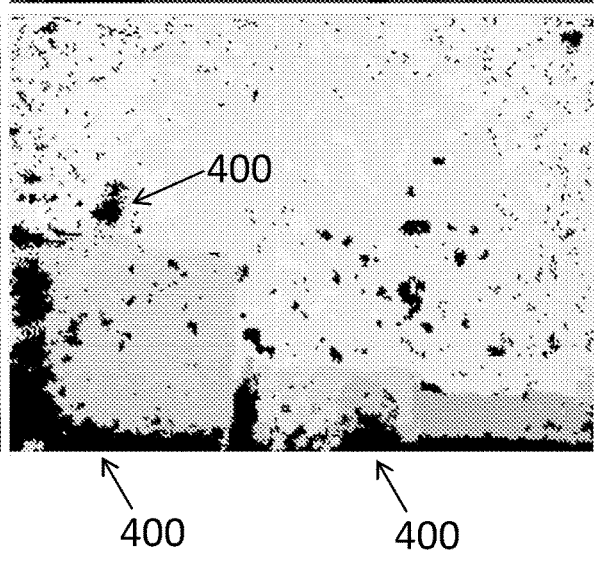
FIG. 4C
FIG. 4D

FIG. 7A
FIG. 7B
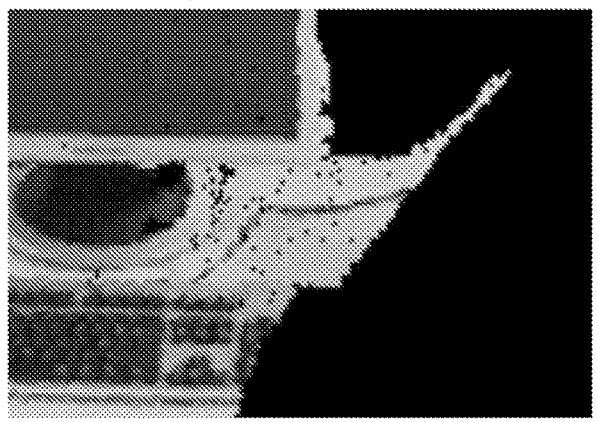
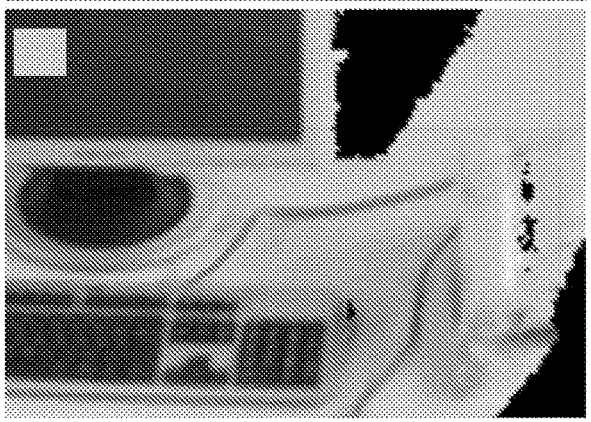
FIG. 7C
FIG. 7D

| Dataset | ours | | | ORB-SLAM2 (RGB-D) | | | ElasticFusion | | | KGBD-SLAM2 | | |
|---|---|---|---|---|---|---|---|---|---|---|---|---|
| | RMSE | MEAN | MAE | RMSE | MEAN | MAE | RMSE | MEAN | MAE | RMSE | MEAN | MAE |
| 01_cir | 0.106 | 0.099 | 0.092 | 0.359 | 0.308 | 0.249 | 0.595 | 0.554 | 0.462 | 1.092/0.122 | 0.434/0.106 | 0.380/0.087 |
| 02_tri | 0.373 | 0.294 | 0.221 | - | - | - | 0.603 | 0.573 | 0.457 | 1.069/0.578 | 0.552/0.397 | 0.388/0.326 |
| 03_rec | 0.123 | 0.110 | 0.097 | 0.143 | 0.116 | 0.100 | 0.454 | 0.388 | 0.367 | 1.326/0.191 | 0.643/0.162 | 0.284/0.174 |
| 04_tri | 0.076 | 0.066 | 0.058 | 0.058 | 0.051 | 0.045 | 0.123 | 0.109 | 0.092 | 0.898/0.124 | 0.365/0.111 | 0.195/0.101 |
| 05_Jan | 0.093 | 0.084 | 0.078 | 0.513 | 0.464 | 0.412 | 0.281 | 0.254 | 0.284 | 1.243/0.760 | 0.784/0.691 | 0.575/0.691 |
| 06_rot | 0.113 | 0.103 | 0.100 | 0.128 | 0.114 | 0.103 | 0.355 | 0.327 | 0.351 | 1.477/0.543 | 1.075/0.520 | 0.925/0.515 |
| 07_shk | 0.021 | 0.019 | 0.017 | 0.035 | 0.021 | 0.019 | 0.024 | 0.021 | 0.020 | 0.022/0.031 | 0.020/0.022 | 0.016/0.016 |
| overall | 0.129 | 0.111 | 0.094 | 0.156 | 0.129 | 0.070 | 0.345 | 0.318 | 0.274 | 1.014/0.335 | 0.554/0.290 | 0.395/0.246 |

Figure 10

| Datasets | ours | ORB2 | EFusion | RGBD2 |
|---|---|---|---|---|
| 01_cir | 73.4 | 41.1 | 5.28 | 18.7 |
| 02_fir | 82.2 | - | 4.72 | 20.1 |
| 03_rec | 81.6 | 41.5 | 5.34 | 18.3 |
| 04_tri | 80.7 | 45.6 | 5.99 | 20.9 |
| 05_dor | 77.2 | 42.7 | 4.58 | 21.1 |
| 06_rot | 77.8 | 46.6 | 4.57 | 21.6 |
| 07_shk | 85.1 | 50.0 | 4.67 | 23.3 |
| overall | 79.7 | 44.6 | 5.05 | 20.6 |

Figure 11

| Platform | Method | Tracking | Mapping | Update |
|---|---|---|---|---|
| Up-Board® | ours | 26.9 | 5.4 | 32.3 |
| | ORB-SLAM2 | 167 | 499 | ⩾167 |

Figure 12

| Dataset | ours | | | OKVIS | | |
|---|---|---|---|---|---|---|
| | RMSE | MEAN | MAE | RMSE | MEAN | MAE |
| 01_trn | 0.091 | 0.082 | 0.079 | 0.128 | 0.112 | 0.094 |
| 02_htp | 0.170 | 0.159 | 0.148 | 0.186 | 0.161 | 0.143 |
| 03_svo | 0.225 | 0.216 | 0.217 | 0.267 | 0.250 | 0.261 |
| 04_ttr | 0.158 | 0.147 | 0.155 | 0.147 | 0.135 | 0.150 |
| 05_vst | 0.099 | 0.092 | 0.083 | 0.124 | 0.112 | 0.096 |
| 06_bsp | 0.091 | 0.081 | 0.075 | 0.110 | 0.104 | 0.104 |
| 07_llt | 0.113 | 0.102 | 0.101 | 0.245 | 0.236 | 0.232 |
| overall | 0.135 | 0.126 | 0.123 | 0.172 | 0.159 | 0.154 |

Figure 13

| Dataset | ours | | | OKVIS | |
|---|---|---|---|---|---|
| | track | map | sum. | match | optimize |
| 01_trn | 8.6 | 2.3 | 10.9 | 32.0 | 31.6 |
| 02_htp | 8.3 | 2.0 | 10.3 | 35.1 | 30.4 |
| 03_svo | 8.4 | 2.7 | 11.1 | 38.3 | 33.8 |
| 04_ttr | 9.4 | 1.3 | 10.7 | 29.2 | 29.5 |
| 05_vst | 8.7 | 1.6 | 10.3 | 36.9 | 28.4 |
| 06_bsp | 8.2 | 2.7 | 10.9 | 35.1 | 35.7 |
| 07_llt | 8.7 | 2.7 | 11.4 | 30.3 | 30.1 |
| overall | 8.6 | 2.2 | 10.8 | 34.0 | 31.2 |

Figure 14

SIMULTANEOUS LOCALIZATION AND MAPPING METHODS AND APPARATUS

CROSS-REFERENCE TO RELATED APPLICATIONS

The present application is a filing under 35 U.S.C. 371 as the National Stage of International Application No. PCT/SG2017/050446, filed Sep. 7, 2017, entitled "SIMULTANEOUS LOCALIZATION AND MAPPING METHODS AND APPARATUS," which claims priority to Singapore Application No. SG 10201607539W filed with the Intellectual Property Office of Singapore on Sep. 9, 2016, both of which are incorporated herein by reference in their entirety for all purposes.

FIELD OF THE INVENTION

The present disclosure relates to simultaneous localization and mapping (SLAM). In particular, it relates to SLAM methods and systems with reduced computational complexity.

BACKGROUND OF THE INVENTION

Self-localization and mapping is one of the most basic capabilities of autonomous robots, and has received increasing attention in tandem with the development of hardware, such as smarter sensors and faster processors. However, 3-D Mapping algorithms are difficult to apply directly to micro-robot systems, especially Micro Unmanned Aerial Vehicles (MUAV) due to the following reasons. First, different from ground robots, MUAV are unable to provide odometer information to correct unacceptable incremental drift in GPS-denied environment. Second, micro-robot systems can only provide limited computational resources, such as ultra-low power embedded processors, due to payload and power limitations. Third, dense maps, which are crucial for higher-level applications, such as collision-free motion planning, object detection and scene understanding, require more computational resources to produce. The motivation of the present disclosure is to develop a light 3-D dense mapping system that can be carried out by micro-robot systems, and achieves faster computational speed with sufficient accuracy.

In the simultaneous localization and mapping (SLAM) problem, data association, which is to relate the sensors' measurements with the landmarks within maps, is one of the most important and time-consuming parts.

In existing SLAM methods, iterative solutions play an important role and have become the bottleneck.

SUMMARY OF THE INVENTION

A simultaneous localization and mapping method according to a first aspect of the present disclosure comprises: receiving a frame of three dimensional point cloud data from a three dimensional point cloud sensor coupled to a robot; receiving inertial measurement data indicative of a change in pose of the three dimensional point cloud sensor; using the inertial measurement data to estimate a rotation between the received frame of three dimensional point cloud data and a key frame of three dimensional point cloud data; applying a rotation to the received frame of three dimensional point cloud data to obtain an aligned frame of three dimensional point cloud data, the aligned frame of three dimensional point cloud data having an orientation aligned with the key frame of three dimensional point cloud data; and estimating a translation of the aligned frame of three dimensional point cloud data from the key frame of three dimensional point cloud data.

By rotating the three dimensional point cloud to align it with the key frame, the process of estimating a translation of the three dimensional point cloud data can be decoupled to spaces with lower degrees of freedom which reduces the computational complexity of the SLAM processing.

In an embodiment, the method further comprises applying an axonometric projection to the aligned frame of three dimensional point cloud data to obtain axonometric image frame data and wherein translation of the aligned frame of three dimensional point cloud data from the key frame of three dimensional point cloud data comprises estimating a translation of the axonometric image frame data in an axonometric image plane.

In an embodiment the method further comprises expanding the axonometric image frame data into a one-dimensional vector and wherein estimating a translation of the axonometric image frame data in an axonometric image plane comprises determining a cyclic shift of the one-dimensional vector.

The estimation of the translation of the aligned frame of three dimensional point cloud data from the key frame of three dimensional point cloud data may be carried out by applying a correlation filter. In some embodiments, the correlation filter is a general kernelized correlation filter (GKCF). The correlation filter may also be implemented as a kernelized correlation filter (KCF).

The method may comprise creating a new key frame if a matching criterion is below a first threshold. The method may further comprise refining the key frame using the aligned frame of three dimensional point cloud data if the matching criterion is above a second threshold. In some embodiments the second threshold is greater than the first threshold. The first matching criterion and/or the second matching criterion may be a peak to side-lobe ratio. In some embodiments the method further comprises refining the key frame using the aligned frame of three dimensional point cloud data.

According to a second aspect of the present disclosure a simultaneous localization and mapping system is provided. The system comprises: a three dimensional point cloud sensor; an inertial sensor; and a processing module configured to: receive a frame of three dimensional point cloud data from the three dimensional point cloud sensor; receive inertial measurement data indicative of a change in pose of the three dimensional point cloud sensor; use the inertial measurement data to estimate a rotation between the received frame of three dimensional point cloud data and a key frame of three dimensional point cloud data; applying a rotation to the received frame of three dimensional point cloud data to obtain an aligned frame of three dimensional point cloud data, the aligned frame of three dimensional point cloud data having an orientation aligned with the key frame of three dimensional point cloud data; and estimate a translation of the aligned frame of three dimensional point cloud data from the key frame of three dimensional point cloud data.

The three dimensional point cloud sensor may be a RGB-D camera, and/or a Stereo Camera and/or a 3D laser scanner.

BRIEF DESCRIPTION OF THE DRAWINGS

In the following, embodiments of the present invention will be described as non-limiting examples with reference to the accompanying drawings in which:

FIG. 4 shows an example of a 6 degree of freedom point cloud rectified to align with a key frame then re-projected to axonometric images;

FIGS. 7a to 7d show an example of a key frame being refined using its subsequent frames;

FIG. 10 is a table showing a real-time accuracy comparison of a method according to an embodiment of the present invention with other methods;

FIG. 11 is a table showing performance efficiency corresponding to the data shown in FIG. 10;

FIG. 12 is a table showing average runtime of tracking and mapping on an ultra-low power platform;

FIG. 13 is a table showing a real-time accuracy comparison on stereo cameras; and FIG. 14 is a table showing an average runtime comparison for the results presented in FIG. 13.

DETAILED DESCRIPTION

The present disclosure is concerned with Simultaneous Localization and Mapping (SLAM) technology for robots, especially Micro Unmanned Aerial Vehicles (MUAV). It leverages on Attitude and Heading Reference System (AHRS) and any 3D sensors that can provide 3D point clouds such as RGB-D camera, Stereo Cameras and 3D laser scanner. The technology is built upon decoupling 3D point cloud data and deriving a non-iterative solution, which reduces computational requirements dramatically compared with traditional methods. Therefore, the system requires very low power and low computational capability devices that can be easily incorporated into an MUAV and provides a superior real-time and reliable dense map with high accuracy. Although designed originally for MUAV, it is envisaged that the systems and methods described herein can also be applied to Augmented Reality (AR) and other kinds of robots, such as Unmanned Ground Vehicles (UGV) and autonomous cars.

Figure 1:
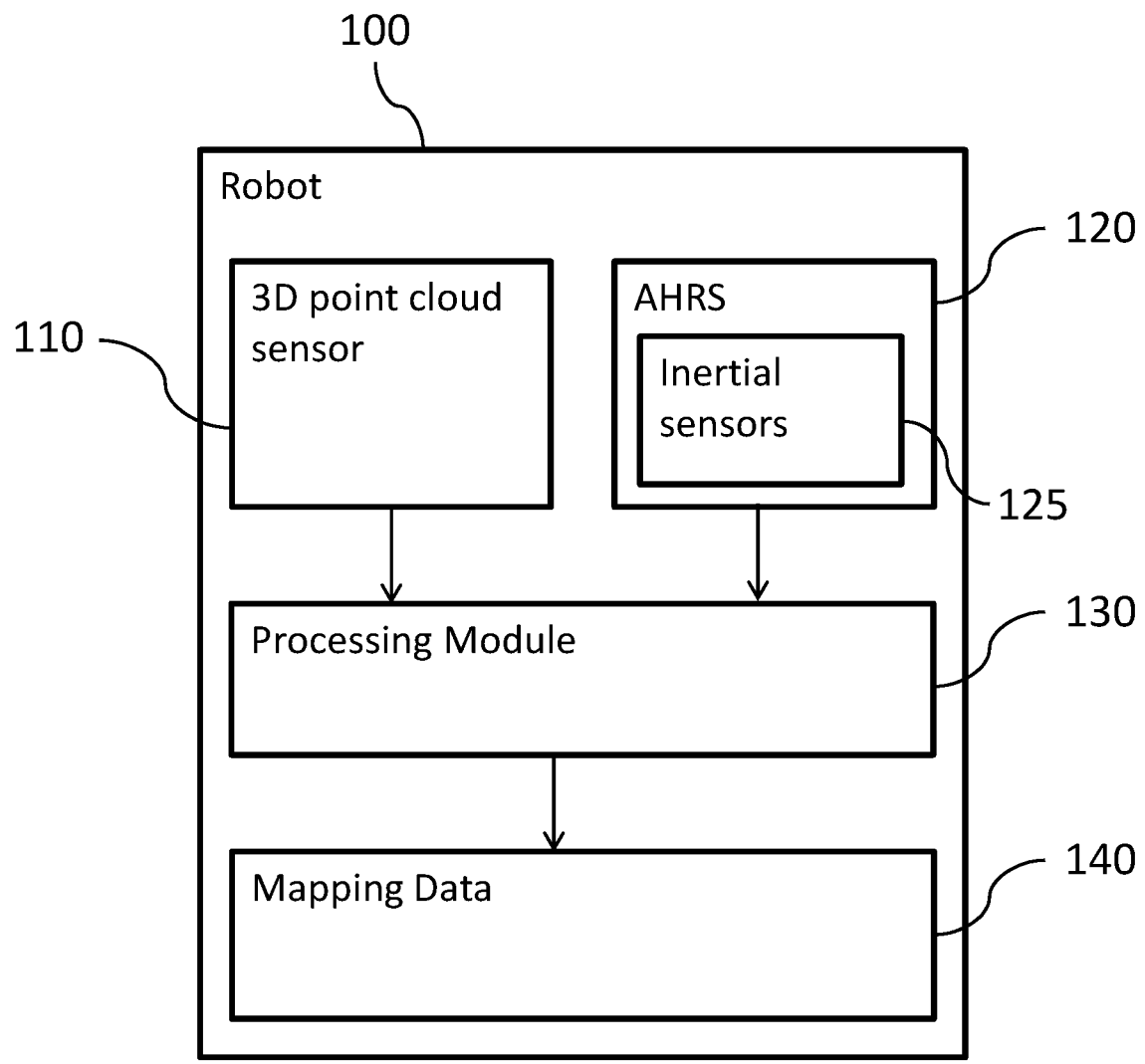
FIG. 1 shows a robot device which incorporates a SLAM system according to an embodiment of the present invention.

FIG. 1 is a block diagram schematically showing the features of a robot involved in the processing of sensor data to generate mapping data. The robot 100 may be a Micro Unmanned Aerial Vehicles (MUAV), alternatively, it may be different type of device such as an Unmanned Ground Vehicle (UGV) or an autonomous car. As shown in FIG. 1, the robot 100 comprises a 3D point cloud sensor 110. The 3D point cloud sensor 110 may be implemented as a RGB-D camera, a Stereo Camera or a 3D laser scanner. The robot 100 further comprises an Attitude and Heading Reference System (AHRS) 120. The AHRS comprises a plurality of inertial sensors 125. The inertial sensors 125 may be arranged three axes to provide attitude information for the robot, including roll, pitch and yaw.

The robot 100 further comprises a processing module 130 which receives 3D point cloud data from the 3D point cloud sensor and attitude data from the AHRS 120. Both the 3D point cloud and the attitude data from the AHRS 120 may be received as frames at regular time intervals. Alternatively, they may also be received in a hardware triggered manner. For example, the processing module may send a signal to the inertial sensors 125 indicating that measurements are required. Upon receiving such a signal, the inertial sensors 125 initiate at the same time and send the measurements to the processing module 130. This will make the measurements synchronized and bypass any time difference error between the measurements, resulting in a more accurate pose estimation. The processing module 130 uses the methods described in more detail below to generate a map of the surroundings and determine the location of the robot 100 within the map. The processing module 130 stores mapping information 140 indicating the map of the surroundings. The mapping information 140 may also include indications of the pose of the robot at different times. The pose of the robot may include an indication of the orientation and the location of the robot. The output of the method may include the acceleration, angular rate and any other variables that can describe the dynamics of the robot.

The mapping information may be used for localization and navigation while the estimated poses can be used for control and navigation in unmanned aerial vehicles (UAV), unmanned ground vehicles (UGV), augmented reality (AR), virtual reality (VR) and other applications.

In one embodiment, the system is implemented for a micro-robot on a credit card sized UpBoard® equipped with an ultra-low power mobile-phone-level processor Atom x5-Z8350 with Scenario Design Power 2W. Running at 1.44 GHz with 2G RAM, this platform is very difficult for most of the existing SLAM algorithms to run in real-time. An Intel RealSense® camera is used as the 3D point cloud sensor.

Figure 2:
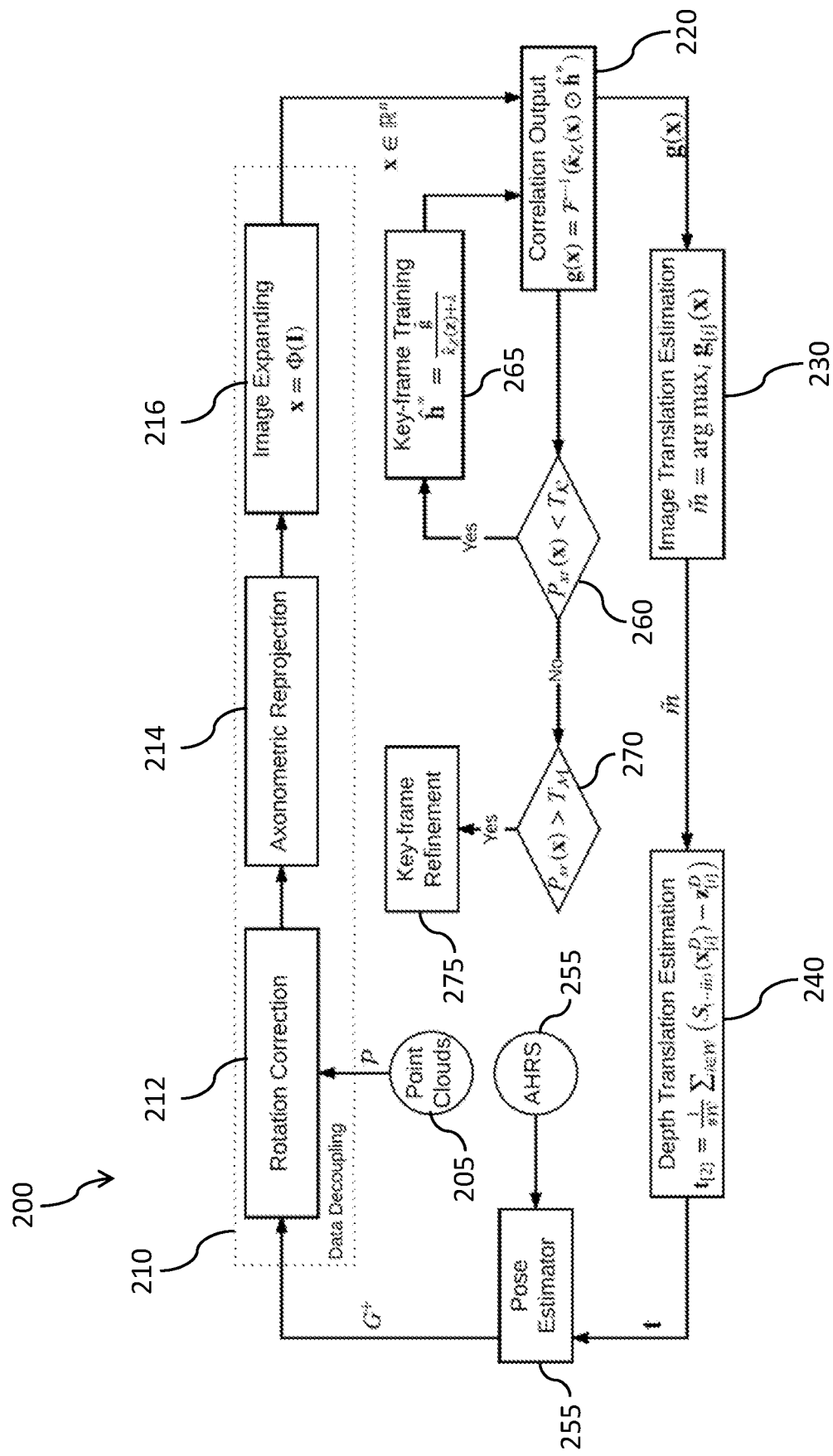
FIG. 2 is a flow diagram illustrating the framework for localization and dense mapping in embodiments of the present invention.

FIG. 2 is a flow diagram illustrating the framework for localization and dense mapping in embodiments of the present invention. In the present disclosure, the term 'non-iterative' is used in discussions of the process, here, this term is used to emphasize that the data association is non-iterative while the processes of mapping and localization are still iterative with each other.

The proposed non-iterative framework 200 shown in FIG. 2 comprises several sub-tasks. The process can be considered as a procedure of decoupling-estimation-recoupling as follows: 3D point clouds are first decoupled into several sub-spaces, where data can be matched independently with lower complexity; then the camera motion is obtained from recoupling the estimation in the sub-spaces. Based on the single key-frame training, it is possible to predict the translation of the decoupled 1-D vector using a general kernelized correlation filter (GKCF).

This process enables the fast motion estimation on ultra-low power processors. The 6 DoF pose estimation is recoupled by fusing the inertial measurements including acceleration and angular rate with a simple pose estimator. Finally, 3-D maps are fused with non-key-frames by a moving average, so that the missing information of key-frames is complemented with complexity O(n).

In the method shown in FIG. 2, a pose estimation $G^+$ is used in data decoupling 210. The superscript '+' indicates the posterior estimation of the pose. It can be regarded as the estimation when measurements are fused into the state.

Here, the current measurements from AHRS are fused with the latest visual measurements (the RGBD images). The posterior state estimation of current pose is obtained after the latest inertial measurement is obtained. The poses of key-frames are obtained in a similar way, and as such they are all the posterior estimations. The terms 'posterior' and 'prior' are used to describe the state estimation obtained respectively 'after' and 'before' a measurement is obtained. The data decoupling 210 takes point cloud data 205 captured by the 3D point cloud sensor 110. The data decoupling 210 comprises rotation correction 212, axonometric re-projection 214 and image expanding 216. In the rotation correction 212, the point cloud data P 205 is rotated so that it is aligned with a key frame of point cloud data. Then, in the axonometric re-projection 214 an axonometric projection is applied to the aligned frame of point cloud data. The image expanding is applied to the axonometric projection of the aligned 3D point cloud data. This gives a 1D image vector x.

A correlation filter g is applied to the image vector x in the correlation output step 220. This gives a correlation output g(x) between the frame image and a key frame. The correlation output g(x) is used to determine an image translation estimation 230. The image translation estimation 230 is determined from the translation of the aligned 3D point cloud data against the key frame indicated by the translation of maximum value of correlation. This gives a translation estimation $\tilde{m}$. A depth translation estimation 240 is then carried out. This gives a 3D translation t which indicates the translation in position of the sensor on the robot.

The 3D translation t is input into a pose estimator 250 which uses the output of the Attitude and Heading Reference System (AHRS) 225 to provide a new pose estimation G. This pose estimation $G^+$ is the posterior pose estimation.

In addition to determining the motion of the robot, the method shown in FIG. 2 also updates a three dimensional map of the environment by updating the key frames and adding new key frames. This process occurs following the calculation of the correlation output 220. In step 260 a peak to side lobe ratio (PSR) of the correlation output g(x) is compared with a threshold $T_K$. If the PSR is below the threshold $T_K$, this indicates that the correlation between the current frame and the key frame is low. This triggers the introduction of a new key frame. Thus the method moves to step 265 in which a filter corresponding to a new key frame is trained. When a new key-frame is trained, the correlation filter will be calculated and stored together with its associated state estimation.

If the PSR is above the threshold $T_K$, this indicates that the existing key frame has a relatively strong correlation with the current frame. However, as described in more detail below, there may be information missing from the key frame. In step 270 the PSR is compared with a second threshold $T_M$. The threshold $T_M$ is greater than the threshold $T_K$ and thus indicates that there is a strong correlation between the current frame and the key frame. If the PSR is greater than this threshold $T_M$, the method moves to step 275 in which the key frame is refined using the aligned data from the current frame.

In the following sections, the method shown in FIG. 2 is described in more detail.

Data Decoupling

This section introduces the process of point cloud decoupling, from 6 Degrees of Freedom (DoF) to 1 Degree of Freedom (DoF). As shown in FIG. 2 an update loop where the first block is also dependent on the output of last block is introduced. Therefore, data decoupling will be introduced on the assumption that a good pose estimation is available from the last update. At the time of beginning, it is just assumed to be located at the origin.

6 Degrees of Freedom (DoF) to 3 Degrees of Freedom (DoF)

To reduce the computation requirements, only the key frames are selected to represent a map. The other point clouds will be registered and fused with those key-frames, so that the missing information of the key-frames can be complemented. In this section, those non-key-frames will be decoupled according to the key-frames.

A point cloud is a set of points with pose $G \in SE(3)$ and are defined with specified color to represent an external surface of an object or environment. To decouple the rotational and translational DoF, we utilize the information of the posterior attitude estimation from the Pose Estimator 290 which is described in more detail below. Assume the $k_{th}$ key-frame is denoted as $K_k(G_k)$, a point cloud $P_i(G_i)$ can be rotated to align with the key-frame by its orientation $R^+ \in SO(3)$ where the superscript+denotes the posterior estimation, so that the aligned point cloud $\tilde{P}_i$ can be obtained through:

$$\tilde{P}_i(t_i) = R_k^+ (R_i^+)^{-1} \mathcal{P}_i(G_i^+)$$

where $$G^+ = \begin{bmatrix} R^+ & t^+ \\ 0 & 1 \end{bmatrix} \text{ with } R^+ \in SO(3) \text{ and } t^+ \in \mathbb{R}^3.$$

In this sense, the original 6 DoF $G_i$ is reduced to 3 translational DoF $t_i$, so that from now on, we only need to estimate the translation of the two point clouds $P_i$ and $K_k$.

The posterior estimates $G^+$ and $R^+$ are obtained from fusing the motion estimation from the depth camera and inertial sensors and will be presented below.

3 DoF to 2 DoF

Computation requirements can be further reduced if the 3-D translation movements can be decoupled into 3 independent axes. The principle is that the geometry properties in the 3 axes must be kept. We propose to apply axonometric projection on the aligned point cloud $\tilde{P}_i(t_i)$ to get axonometric color and depth image $I^C$; $I^D \in \mathbb{R}^{M \times N}$. A 3-D point $p=(x; y; z)^T \in P$ on the visible scene surface is mapped to image coordinates $u=(u; v)^T \in \Omega$ through the axonometric projection model $\pi_a : \mathbb{R}^3 \mapsto \mathbb{R}^2$ that is defined as:

$$\begin{bmatrix} u \\ v \end{bmatrix} = \frac{1}{r_k} \begin{bmatrix} x \\ y \end{bmatrix}_{\tilde{c}}$$

where $r_k \in \mathbb{R}^+$ is the projection resolution that can be set adaptively. It is different from the concept of focal length which is fixed. The subscript $\tilde{c}$ denotes that the point coordinates are expressed in the aligned camera frame. The axonometric depth image is defined as:

$$\mathbb{R}(u) = [z]_{\tilde{c}}$$

which stores the point distances to the axonometric plane versus the perspective depth image that stores the distances to the principal point. The differences between perspective projection and axonometric projection are illustrated in FIGS. 3a and 3b.

Figure 3A:
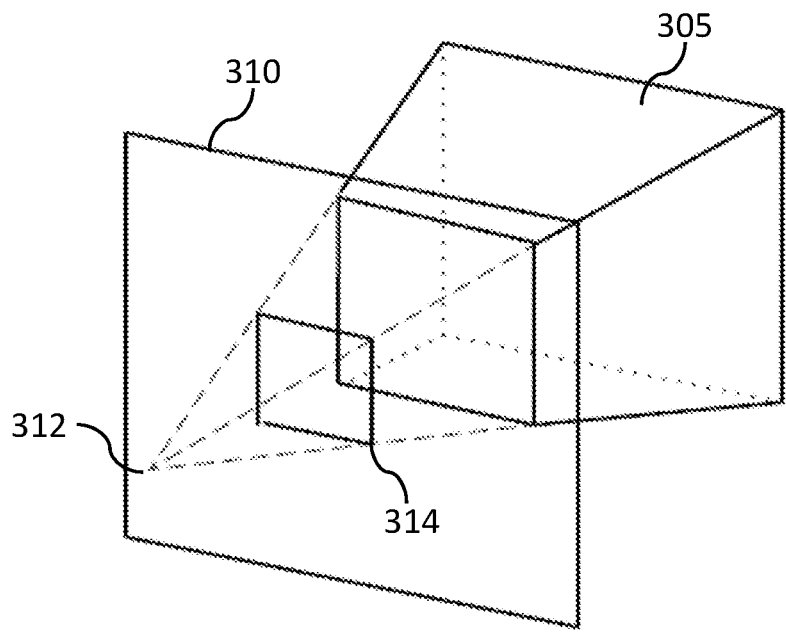
FIGS. 3a and 3b show perspective and axonometric projections.
Figure 3B:
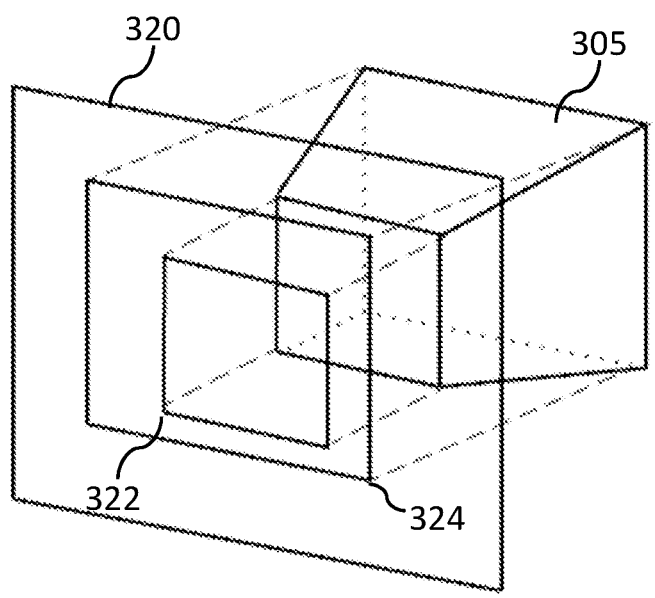

FIGS. 3a and 3b show perspective and axonometric projections. FIG. 3a shows a perspective projection 310 of a scene comprising a quadrangular frustum pyramid 305. The prospective projection 310 projects 3-D points on the principal point 312. As shown in FIG. 3a, the quadrangular frustum pyramid 305 appears as a rectangle 314 vertex of the quadrangular frustum pyramid 305 coincides with the principal point 312. FIG. 3b shows an axonometric projection 320. The axonometric projection 320 projects points on the axonometric plane. As shown in FIG. 3b, when the quadrangular frustum pyramid 305 is projected into the axonometric plane, the size ratio of the two rectangles 322 and 324 will not change. In the present disclosure, this simple property is used for data decoupling.

The perspective projection does not keep the geometric relationship since an objects becomes smaller as its distance from the view point increases, while in axonometric projection, the original size of an object is kept. This property decouples the original 3-D translation into the 2-D translation on the axonometric plane and 1-D translation perpendicular to the plane. Therefore, instead of estimating the movements of the point cloud in 3-D space, we can now estimate the 2-D translation of the axonometric images followed by 1-D depth translation estimation.

Before that, one thing that needs to be considered is the projection resolution $r_k$ which is physically the size of covered space by each pixel. The field of view of axonometric projection is a cuboid space with the central axis coinciding with the camera optical axis. Its covered space is determined by the image size M×N and the projection resolution $r_k$. Since points outside of the cuboid will be cropped, $r_k$ is needed to be set large enough to make the cuboid cover most of the points. Meanwhile, there will be a large black margin on the image, if $r_k$ is set too large, since not all the pixels can be covered by the projecting points. Moreover, the minimum cuboid envelope of a point cloud may change dramatically because of the camera movements. To be robust to the changing scenes, we implement a searching procedure listed in Algorithm 1 to set resolution $r_k$ adaptively.

---
Algorithm 1: Pseudocode for Finding Adaptive $r_k$
---
Input: Sampled Point Cloud K'$_k$
Output: Adaptive Resolution $r_k$
1   Axonometric Image Size S
2   Cuboid $c_i \in C$ ; /* C is the candidates set that are calculated from image size S */
3   $c_i$.num ← 0
4   for point $p_j$ in K'$_k$ do
5       find minimum Cuboid $c_i \in C$ that contains $p_j$
6       $c_i$.num ← $c_i$.num + 1
7   c ← arg min$_{c_i}${$c_i$ | $c_i$.num ≥ 0.8* | K'$_k$ |, $c_i \in C$}
8   $r_k$ ← c/S Since most of the boundary points of a point cloud are outliers, according to one embodiment of the present invention, algorithm 1 tries to find the cuboid envelope that covers 80% points in the cloud. To be more efficient, it traverses a point cloud by sampling one point in every 25 points. Note that in this process, we keep the central axis of the cuboid envelope coincided with the camera's optical axis. Although the sampling is not precise, we find that the approximation is acceptable and the cost is deserved, since its complexity is only O(n=25), so that the computational time of Algorithm 1 can even be ignored compared to the calculation in the following sections. To further reduce repeated computation, $r_k$ is updated by $r_k$+1 only when the key-frame $K_{k+1}$, is created. Hence, all the clouds $\tilde{P}_i$ acquired between $K_k$ and $K_{k+1}$, are projected with the resolution $r_k$ and registered with the key-frame $K_k$. Another advantage of adaptive resolution is that when the camera is near to the scene surfaces, more details of the scenes are preserved with smaller $r_k$. A skilled person shall understand that other suitable percentages or sample sizes can also be used. For example, the cuboid envelope may cover any percentage in the range 0% to 100% of the points in the cloud. From experience, it has been found that values in the range 50%-100% are particularly effective. The sample size is also empirical, any value up to 1-n is possible (n is the number of points in a point cloud), the larger the value is, the faster the algorithm is, but the result is more coarse.

Since the point clouds are generated by pinhole cameras, when they are re-projected on the axonometric plane, some black holes may appear inside the image. This is because some invisible points for pinhole cameras are also projected on the axonometric plane. However, these black holes do not affect the translation estimation and can be filled by the map fusion process which is described below.

FIG. 4 shows an example that a 6 DoF point cloud is rectified by the attitude estimation and then re-projected to axonometric images. As shown in FIG. 4, a point cloud (a) captured by Intel RealSense is rectified by AHRS shown in (b) which is a perspective image. Then it is re-projected to an axonometric color image (c) and axonometric depth image (d). Some black holes 400 can be seen in (c) and (d), since some invisible points in (b) are also projected to the axonometric image plane.

2 DoF to 1 DoF

To estimate the translation of two axonometric images, we need to find the translation of their maximum overlap which is defined as the region of interest (ROI). To this end, we further decouple the axonometric image into a 1-D vector.

Let an image:

$$I=[I_{(0)}, I_{(1)}, \ldots, I_{(M-1)}]^T \in \mathbb{R}^{M \times N},$$

where $I^T_{(i)} \in \mathbb{R}^N$ is the ith row of I, its expanded 1-D vector $x \in \mathbb{R}^{MN}$ can be defined through an expanding operator $x=\psi(I)$ where $\psi: \mathbb{R}^{M \times N} \mapsto \mathbb{R}^{MN}$ is a bijective function on the condition that the matrix size (M, N) is known:

$$\Psi([I_{(0)}, \ldots, I_{(M-1)}]^T)=[I_{(0)}^T, \ldots, I_{(M-1)}^T]^T$$

Define the vector's circular shift operator $S_m(x): \mathbb{R}^{M \times N} \mapsto \mathbb{R}^{MN}$ RMN, where $m \in [0, MN-1]$ denotes the operator that circular shifts m elements for x, then the matrix's translation with (x, y) elements is defined as $S_{(x,y)}(\cdot): \mathbb{R}^{M \times N} \mapsto \mathbb{R}^{MN}$ $$\mathcal{S}_{(x,y)}(I) := \Psi^{-1}(\mathcal{S}_{(m)}(\Psi(I)))$$

where $$x = \begin{cases} (m+1)/N & \text{if } (m+1)/N \leq \frac{M}{2} \\ (m+1)/N - M & \text{else} \end{cases}$$

$$y = \begin{cases} m \% N & \text{if } m \% N \leq \frac{M}{2} \\ m \% N - N & \text{else} \end{cases}$$

The definition of matrix translation above is slightly different from our intuitive understanding. For the clarity of the presentation, an intuitive explanation is illustrated in FIG. 5 where 2-D translation of a matrix can be regarded as a unique 1-D circular shift of its expanded vector.

Figure 5:
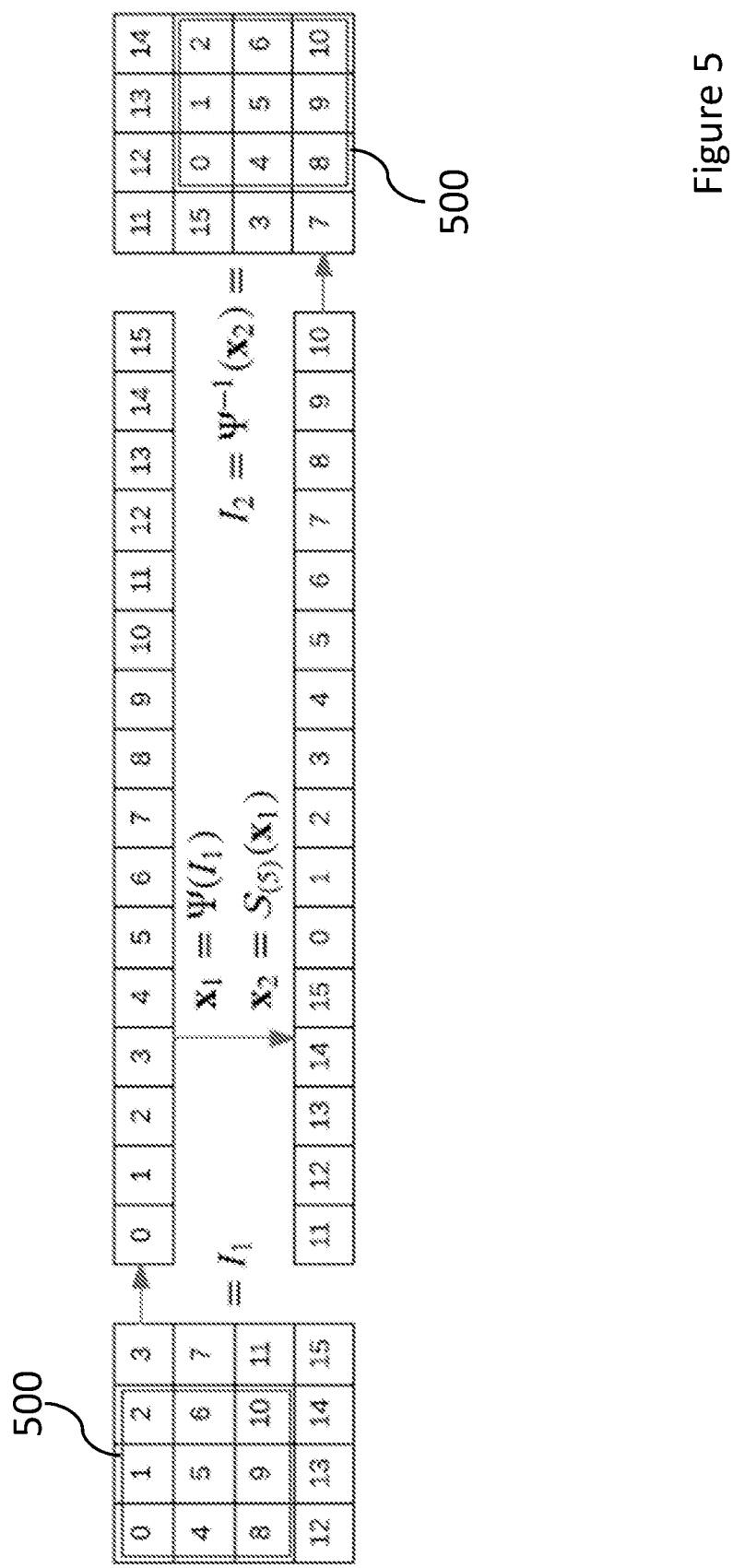
FIG. 5 shows the expansion of axonometric images into 1-D vectors to determine translation between the images in an embodiment of the present invention.

FIG. 5 shows the expansion of axonometric images into 1-D vectors to determine translation between the images. As shown in FIG. 5, a first image $I_1$ is expanded into a 1-D vector $x_1 = \psi(I_1)$ and the 2-D translation $S_{(x,y)}(I_1)$ between image $I_1$ and image $I_2$ can be mapped on to a unique circular shift of 1-D vector $S_{(m)}(x_1)$. In the example shown in FIG. 5, N=4, M=4, the matrix after translation $I_1 = S_{(x,y)}(I_1)$ can be obtained by substituting m=5 into the above equations for x and y hence x=1, y=1. The elements outside the ROI (that is the elements outside the rectangle 500) contribute nothing for finding translation, hence the malposition of these elements is ignored.

A side effect caused by the definition above is the malposition of the elements outside of the ROI. However, those elements contribute nothing for finding the translation, so that they can just be ignored. In practice, the expanding operation $\psi(\cdot)$ and its inverse operator $\psi^{-1}(\cdot)$ do not need to be implemented, since a dense matrix or an image is always stored as its expanded vector in the computer memory. The only thing we need to do is to reinterpret memory through a pointer, hence the complexity of decoupling the translation of an axonometric image is O(1). From now on, the problem becomes finding the 1-D translation of the maximum overlap of two vectors. We will not distinguish an image and its expanding vector unless necessary.

Single Key-Frame Training

A non-linear correlation filter is applied to predict the vector translation. Correlation filters are widely used for object tracking and alignment but have not been used for data association in SLAM problem. The filter used in this disclosure is based on a General Kernelized Correlation Filter (GKCF), and the following description gives a short description and shows its natural underlying connection to Minimum Output Sum of Squared Error (MOSSE) filters and Kernelized Correlation Filters (KCF).

For the sake of simplicity, the axonometric key-frame and non-key-frames will be denoted as column vectors $z^{C,D}$, $x^{C,D} \in \mathbb{R}^n$, where the superscript C, D denotes the color and depth images respectively. They will be left out in the absence of a little ambiguity and will not be distinguished unless necessary. The derived results can be easily extended to matrix case.

The Convolution Theorem says that the correlation operation becomes element-wise conjugate multiplication in Fourier domain. Denote the Fast Fourier Transformation (FFT) $F(\cdot)$ on a vector as $\hat{\cdot}$, i.e. $\hat{x} = F(x)$ so that the correlation of two vectors $g = x*h$ is equivalent to $\hat{g} = \hat{x} \odot \hat{h}^*$ where the operator $\odot$ and the superscript * denote element-wise multiplication and complex conjugate respectively. The bottleneck of this operation is to compute the forward and inverse FFTs, hence the complexity of the entire process has an upper bound O(n log n) where n is the number of elements in the vector. Define the non-linear feature mapping function $\varphi: \mathbb{R}^n \mapsto \mathbb{R}^d$, d>>n, the kernel trick is to find the inner product of feature mapping without calculating the high dimension features explicitly. Define the kernel function as K: $\mathbb{R}^n \times \mathbb{R}^n \mapsto \mathbb{R}^d$ such that:

$$\mathcal{K}(x_i, x_j) = \varphi(x_i)^T \varphi(x_j)$$

Given a test image $x \in \mathbb{R}^n$ and its desired correlation output $g \in \mathbb{R}^n$, the kernel correlation is defined as:

$$\hat{g} = \hat{\mathcal{K}}_z(x) \odot \hat{h}^*$$

where:

$$\hat{\mathcal{K}}_z(x) = [\hat{\mathcal{K}}(x, z_0), \ldots, \hat{\mathcal{K}}(x, z_{m-1})]^T$$

and $z_i \in \mathbb{R}^n$ are the sample-based vectors to imply the training objective and are generated from the training sample z. Note that the length of filter h and correlation target g is related to the number of sample-based vector $z_i$, i.e. g, $h \in \mathbb{C}^n$ and normally $n \neq m$. The correlation output is transformed back into the spatial domain using the inverse FFT. Generally, when a set of training samples $z^i$ and their associated training outputs $g^i$ are given, we hope to find a filter h to satisfy the objective of the above kernel definition. Generally, $g^i$ can take any shape and will be discussed later. Training is conducted in the Fourier domain to take advantage of the simple element-wise operation between the input and output. To find the filter h that maps training inputs to the desired outputs, the sum of squared error (SSE) between the correlation output and the desired output in Frequency domain is minimized:

$$\min_{\hat{h}^*} \sum_i \left\| \hat{k}_{z^i}(z^i) \odot \hat{h}^* - \hat{g}^i \right\|^2 + \lambda \|\hat{h}^*\|^2$$

where the second term is a regularization to prevent over fitting. Note that the correlation filter MOSSE also minimizes SSE, however the difference is that MOSSE only finds a linear correlation filter, while our objective is to find a non-linear correlation filter based on the kernel trick which is still at a reasonable computational cost. In this sense, MOSSE is the linear case of GKCF and is equivalent to the above kernel correlation when $k_z(x) = x$. Solving the above optimization problem requires setting zero to the first derivative of the filter $h^*$, $$\frac{\partial}{\partial \hat{h}^*} \left( \sum_i \|\hat{k}_{z^i}(z^i) \odot \hat{h}^* - \hat{g}^i\|^2 + \lambda \|\hat{h}^*\|^2 \right) = 0.$$

Since all the operations in this optimization problem are performed in element-wise, the elements of $\hat{h}^*$ can be found independently, and a closed-form solution can be obtained:

$$\hat{h}^* = \frac{\sum_i \hat{g}^i \odot \hat{k}_{z^i}^*(z^i)}{\sum_i \hat{k}_{z^i}(z^i) \odot \hat{k}_{z^i}^*(z^i) + \lambda}$$

where the operator $\div$ denotes the element-wise division. Note that a previously proposed kernelized correlation filter (KCF) which looks similar to the above equation but there are some differences. First, starting from the kernel regression model, the target of KCF is a scalar, while ours is based on the kernel correlation operation whose target is a vector or matrix. Second, KCF is derived from the minimization of regression error in time domain, its solution in Fourier domain is obtained by diagonalizing the circulant matrix with discrete Fourier transform, which means that KCF can only be applied when the training samples are the circular shifts of one patch. On the contrary, the solution presented above is obtained by the minimization of correlation outputs error which is in Fourier domain naturally. This makes our solution applicable to arbitrary training samples. More specifically, we can assume that only one training sample $z \in \mathbb{R}^n$ is available, hence the summation for the number of training samples $z^i$ can be left out and a more compact formula is obtained, $$\hat{h}^* = \frac{\hat{g}}{\hat{k}_Z(z) + \lambda}$$

Furthermore, when we set the pre-designed data xi as the circular shifts of the single training sample z, i.e. $x_i = S_{(i)}(Z)$, so that m=n, this compact solution becomes exactly the same with the solution to KCF. One underlying problem of KCF is that it requires the kernel functions satisfy K(x, z)=K(Mx,Mz) for any permutation matrix M. However, GKCF can be applied to any kernel function. In this sense, KCF is a special case of GKCF when the following conditions are satisfied: First, only one training sample z is available; second, the sample based vectors are the circular shifts $z_i \in S(z)$. Last, the kernel functions treat all dimensions of data equally.

Based on the GKCF, the pattern of translational motion of the key-frame z is learnt and stored in the filter h. In the experiments, the following radial-basis kernel is used for calculating the kernel vector $\hat{k}_Z(x)$:

$$\hat{k}(x, z_i) = h(\|x - z_i\|^2)$$

To compute the kernel vector efficiently, we first expand the norm:

$$h(\|x - z_i\|^2) = h(\|x\|^2 + \|z_i\|^2 - 2x^T z_i)$$

Since $\|x\|^2$ and $\|z_i\|^2$ are constant, the kernel vector can be calculated as:

$$\kappa_Z(x) = [h(\|x - z_1\|^2), \ldots, h(\|x - z_n\|^2)]^T$$
$$= h(\|x\|^2 + \|z\|^2 - 2[x^T z_1, \ldots, x^T z_n]^T)$$

From the correlation theory, since $z_i$ are the circular shifts of z:

$$x * z = [x^T z_1, \ldots, x^T z_n]^T$$

This is substituted into the above equation for the kernel vector:

$$\kappa_Z(x) = h(\|x\|^2 + \|z\|^2 - 2 \cdot x * z)$$
$$= h(\|x\|^2 + \|z\|^2 - 2 \cdot \mathcal{F}^{-1}(\hat{x} \odot \hat{z}))$$

The bottle-neck of the lower equation is the forward and backward FFTs, so that the kernel vector can be calculated in complexity O(n log n).

In the embodiment described above, a General Kernalized Correlation Filter (GKCF) is used to estimate the vector translation. In an embodiment, the translation estimation may be carried out as follows using a kernalized correlation filter (KCF) as follows.

The fundamental idea is that we want to learn the pattern of an expanded key axonometric image so that the translation of a new image can be predicted directly based on the assumption that there is enough overlap between the key frame and the new frame. Assume that the N by M key axonometric image is denoted by a column vector $x \in \mathbb{R}^n$ where n=N×M. Hence the training samples can be defined as $X = [x_0, x_1, \ldots, x_{n-1}]^T$ where $x_i$ is obtained from cyclic shifted x by i pixels. Basically, X is a circulant matrix and can be defined as X=C(x), since it can be generated by its first row $x^T$. The training objective is to find a regression function $y_i = f(x_i)$ where each sample $x_i$ is with a target $y_i$, so that when a test sample z is given, f(z) will be corresponding to a translation-related target. Intuitively, if $y_i = i$, the translation of the test samples can be predicted directly. However, since only the zero-shift sample $x_0$ is concerned, the label $y_0$ is set as 1, while all the others are 0. In this sense, all the non-zero-shifts are considered as negative samples, which makes the regression function more distinctive.

1) Linear Case: A linear regression function is defined as $f(x) = w^T x$, $w \in \mathbb{R}^n$. Given the training samples X, the objective is to find the coefficient vector w by minimizing the squared error over the regression function and the target.

$$w^* = \underset{w}{\operatorname{argmin}} \sum_{i=1}^{n} (f(x_i) - y_i)^2 + \lambda \|w\|^2$$

where $\lambda$ is a regularization parameter to prevent overfitting. This is a ridge regression problem and can be solved by setting its first derivative to zero. Define $y = [y_0, y_1, \ldots, y_{n-1}]^T$, a closed-form solution can be found in complex domain:

$$w^* = (X^H X + \lambda I)^{-1} X^H y$$

where H denotes the conjugate transpose. For a 480×360 axonometric image, where n=172800, it requires to compute the inversion of 172800×172800 matrix ($X^T X + \lambda I$), which is impossible to carry out in real-time. However, it is interesting to note that, different from a traditional machine learning problem, X=C(x) is a circulant matrix. This amazing property makes the solution easy to obtain due to the following lemma.

Lemma 1 (J. F. Henriques): If X is a circulant matrix, the solution can be converted into frequency domain:

$$\hat{w}^* = \frac{\hat{x}^* \odot \hat{y}}{\hat{x}^* \odot \hat{x} + \lambda}$$

where $\hat{\ }$ denotes the discrete Fourier transform and the superscript operator * is the complex conjugate, $\odot$ and $\div$ are the element-wise multiplication and division respectively.

Except for the Fourier transform, all the operations in the above are element-wise. Therefore, the complexity is dominated by the fast Fourier transform (FFT) O(n log(n)) where n is the number of points in the axonometric image. While the complexity of the original solution is dominated by a matrix inversion, whose complexity has a lower and upper bounds, given by matrix multiplication O(n2 log(n)) and Gauss-Jordan elimination method O(n³). For a 480×360 image, where n=172800, the complexity ratio r∈[O(n² log (n))/O(n log(n)); O(n³)/O(n log(n))]=[172800; 2480000000], which implies that lots of running time can be saved if the problem is solved by this Lemma.

2) Non-linear Case: Data samples may be linearly separable in a high dimension space although they are not in the original space. Suppose $\_\emptyset(\cdot)$ is a high dimension feature space, such that $\phi: \mathbb{R}^n \to \mathbb{R}^n$ where d>>n, a kernel k is the inner product of the feature mapping:

$$k(x,z) = \phi(x)^T \phi(z)$$

where z is a test sample. The solution $w \in \mathbb{R}^d$ is expressed as a linear combination of training data xi in the feature space:

$$w = \sum_{i=0}^{n-1} \alpha_i \phi(x_i)$$

The regression function becomes:

$$f(z) = w^T \phi(z) = \sum_{i=0}^{n-1} \alpha_i \kappa(x_i, z)$$

Then minimizing the original objective function is equivalent to finding the combination coefficient $\alpha = [\alpha_0, \alpha_1, \ldots \alpha_{n-1}]^T$. Given the training data X, the solution becomes:

$$\alpha = (K + \lambda I)^{-1} y$$

where K is the kernel matrix with each element $k_{ij} = k(x_i; x_j)$. The dimension of α depends on the number of samples that is the length of x. Fortunately, the kernel matrix K is circulant when $k(x_i; x_k)$ is a Gaussian kernel:

$$\kappa(x_i, x_j) = -\frac{1}{2\pi\sigma^2} e^{-\frac{\|x_i - x_j\|^2}{2\sigma^2}}$$

Therefore, the solution can be calculated in frequency domain with complexity O(nlog(n)):

$$\hat{\alpha} = \frac{\hat{y}}{\hat{k}^{\hat{x}x} + \lambda}$$

where $k^{xx}$ is the first row of the kernel matrix $K = C(k^{xx})$. To guarantee the robustness, all the circular shifts of a sample z are tested. Define the kernel matrix $K^{zx}$ where each element $K_{ij} = k(z_i; x_j)$ and $z_i$ is the $i^{th}$ row of the circulant matrix C(z), from the regression function, we have $$f(z) = K^{zx} \alpha$$

where $$f(z) = [f(z_0), f(z_1), \ldots, f(z_{n-1})]^T$$

Since $K^{zx}$ is a circulant matrix, again we have:

$$K^{xz} = C(k^{zx})$$

where $k^{zx}$ is the first row of $K^{zx}$. Therefore, the response of the circular shifted samples can be found in the frequency domain:

$$\hat{f}(z) = \hat{k}^{\hat{z}x} \odot \hat{\alpha}$$

There are similarities between this derivation and the GKCF derivation described above.

Translation Estimation

Based on the single key-frame training, the translational pattern of a new axonometric image can be estimated directly by regarding the new frame as a test sample.

Image Translation Estimation

To make the correlation output more distinctive, g is set as binary vector, such that the single peak is located at the first element, i.e. $g_{[0]}=1$, where the brackets [·] are used accessing the element with index (starting from 0). The explanation is that, after computing a kernel correlation for a test image in the Fourier domain and converting back to the spatial domain, the shift output of value 1 will correspond to the shift of the test sample. Because of the noises and occlusion, it is nearly impossible to get the exact peak value 1. Instead, the location of the maximum value can be used to indicate the translation $\hat{m}$ of the test images.

$$\hat{m} = \operatorname{argmax}_i \underbrace{\mathcal{F}_{[i]}^{-1}\left(\hat{k}_Z(x) \odot \hat{h}^*\right)}_{\hat{g}_{(i)}(x)}$$

By substituting this equation into the above equations for x and y and multiplying by the adaptive resolution $r_k$, the predicted translation: $[t_{[0]}, t_{[1]}]^T$ of the axonometric image can be obtained:

$$[t_{[0]}, t_{[1]}]^T = r_k \cdot [\tilde{x}, \tilde{y}]^T$$

The complexity the above equation for hi is bounded by the calculation of the kernel vector and the inverse FFT of the correlation output $\hat{g}(x)$, hence we can obtain image translation estimation: $[t_{[0]}, t_{[1]}]^T$ with complexity O(n log (n)).

Depth Translation Estimation

The ROI of axonometric image x is matched with key-frame z, if x is shifted back with $\hat{m}$ elements. Inspired by this, the camera motion in the depth direction can be estimated in the following equation which averages the depth differences of the matched ROI. Since not all the pixels in the ROI are projected by valid points in a cloud, we remove these pixels inside the black holes and only take the points in the set W defined in the following equation that contains all well-matched pixels.

$$t_{[2]} = \frac{1}{\#W} \sum_{i \in W} (S_{(-\hat{m})}(x_{[i]}^{\mathcal{D}}) - z_{[i]}^{\mathcal{D}}),$$

$$W = \{i \mid \rho(S_{(-\hat{m})}(x_{[i]}^{C,\mathcal{D}}) - z_{[i]}^{C,\mathcal{D}}) < T_{c,d}\}$$

where the operator # returns the number of elements in a set and ρ(·) is a general objective function ($L_1$-norm in our tests). The predefined thresholds $T_c$ and $T_d$ are designed to eliminate the influence of the dynamic points. This is because dynamic objects naturally cannot be matched with the shifted image $S_{-\hat{m}}(x)$ either in color or depth spaces.

Figure 6A:
FIGS. 6a and 6b show an axonometric depth image and its corresponding well-matched points.
Figure 6B:

FIGS. 6a and 6b show an axonometric depth image and its corresponding well-matched points. The image in FIG. 6a is an axonometric depth image captured from real time data. The image in FIG. 6b shows the corresponding well-matched points by pixel intensities. The higher the brightness, the more confidence the matches have.

The advantage of using the above equations is that they only require the average differences of depth image which is extremely fast to be computed and all the well-matched points contribute to the estimation, making it robust to depth noises. Therefore, the complexity of depth translation estimation is bounded by O(n). Now, the 3-D translation $t_i$ of the point cloud $\tilde{P}_i$, relative to the key-frame $K_k$ is obtained separately based on the decoupled translational motion.

Key-Frame Selection

As the camera moves, the overlap between the new point cloud and the key-frame may decrease. Hence the peak value may not be distinct enough and new key-frame is needed to ensure large overlap. Since all the new point clouds are matched with key-frames, estimated error will be accumulated when a new key-frame is created. Although loop closure is able to reduce such accumulated error, it needs the camera to revisit a location which cannot always happen. Therefore, it is needed to be very careful to create a new key-frame. There are some useful works doing this. For example, dense visual odometry (DVO) uses the logarithmic determinant of error distribution covariance matrix to determine when to create a new key-frame. Parallel Tracking and Mapping (PTAM) created several conditions for inserting new key-frames: the distance to the last key-frame is large enough; at least twenty key-frames are passed. The ORB-SLAM implementation of SLAM added new conditions: imposing a minimum visual change based on percentage of tracked features. However, these conditions are added in an ad-hoc way, and may not be suitable for all scenarios. For example, when the camera moves very fast, the condition of passed twenty frames may prevent creating enough key-frames and will make the camera lose tracking easily. Also, when the motion is gentle, there may be too many key-frames which are not necessary. Therefore, we argue that the condition for creating new key-frames should not be relevant to the number of passed frames and the maximum overlap or the percentage of tracked features but should be able to represent the matching quality, since the overlap of two frames may not be proportional to the matching quality because of existence of dynamic objects, etc. Considering the computational cost, we propose to apply a very simple criterion, i.e. peak to side-lobe ratio (PSR) $P_{sr}: \mathbb{R}^n \mapsto \mathbb{R}$ which is a measurement of peak strength. In this criterion, the correlation output $g(x)$ is split into the peak which is the maximum value and the side-lobe which is the rest of pixels excluding the peak:

$$P_{sr}(x) = \frac{\max g_{[i]}(x) - \mu_s}{\sigma_s} < T_K$$

where $\mu_s$ and $\sigma_s$ are the mean and standard deviation of the side-lobe. A straightforward explanation is that the peak strength of the correlation output $g(x)$ indicates the matching confidence level. The desired output with single peak has infinite peak strength. $P_{sr}(x)$ is regarded as a trigger to insert a new key-frame x into map when it is smaller than $T_K$. The criterion is not only able to control the minimum confidence of each matching, but also save computational time, especially when the camera is kept still or moving slowly since there is no new training data is required. Only the calculation of mean and standard deviation of the side-lobe are performed in the calculation of the criterion, hence the complexity of computing $P_{sr}(x)$ is $O(n)$ where n is the number of pixels in the axonometric image.

Map Refinement and Fusion

As mentioned earlier, not all the pixels of axonometric images can be reprojected by valid points, some black holes may appear. Although they have no influence on the position estimation, we hope to fill those missing information by integrating the point clouds from other frames. A very simple idea is to complement the missing information of the key-frame z by the non-key-frames $x_k$ that are already matched with the key-frame z. This is useful especially when the camera is kept still or moving slowly, since the criterion for creating new key-frame is often not satisfied, and all those new frame $x_k$ can be used to refine the key-frame z. Defining the weights vector $w \in \text{Dom}(z)$, it is proposed to refine the key-frame $z^{C,D}$ by the moving average defined in the following equations which relate to color and depth spaces respectively.

$$s_k \leftarrow w^z + \mathcal{S}_{(-m)}(w_k^x) + e,$$

$$z^C \leftarrow (w^z \odot z^C + \mathcal{S}_{(-m)}(w_k^x \odot x_k^C))/s_k,$$

$$z^C \leftarrow (w^z \odot z^C + \mathcal{S}_{(-m)}(w_k^x \odot (x_k^T - t_{[2]})))/s_k,$$

$$w^z \leftarrow w^z + \mathcal{S}_{(-m)}(w_k^x),$$

where e is a small scalar (set as 1e$^{-7}$) to prevent division by 0. The elements of the weights vector $w \in \mathbb{R}^n$ represent the weight of the corresponding pixel to be fused. Each time a frame $x_k$ is acquired, its corresponding weight vector $w_k^x$ is initialized as $w_{k[i]}^x \leftarrow \{0,1\}$ where 1 or 0 indicates whether the pixel $x_{[i]}$ can be seen in the original point cloud or not. This initialization is performed together with the procedure of axonometric re-projection. When the frame $x_k$ is selected as a new key-frame, the weights vector $w_z$ is initialized by the weight vector of that frame, i.e. $w^z \leftarrow w_k^x$. Because of the dynamic points and outliers, some valid points in the key-frame z cannot be matched with $x_k$. Hence, we remove the unmatched points before performing the refining. To this end, the pixels of $w_k^x k$ corresponding to those points are set as 0 in as in the following equation, so that they cannot be fused into the key-frames.

$$w_{k[i]}^x \leftarrow 0, \text{ if } i \notin W$$

where the set W is defined above with reference to depth translation estimation and contains all matched points indexes. To obtain higher quality map the calculation of the moving averages is performed only when $P_{sr}(xk) > T_M$ where $T_M$ is a threshold to control the confidence of map fusion and normally $T_M > T_K$. Since all the operations are element-wise, the complexity of map refinement process is $O(n)$ where n is the number of points in frame $x_k$.

FIGS. 7a to 7d show an example of a key frame being refined using its subsequent frames. FIG. 7a shows a new key cloud. FIG. 7b shows the refined key cloud during runtime. FIG. 7c and FIG. 7d are the same part of new and refined key point cloud in FIG. 7a and FIG. 7b respectively. Note that the keyboard on the desk is nearly perfectly complemented. The moving average operation does not result in blurring, if the image translation is estimated correctly. FIG. 7 demonstrates that the missing information of key-frames can be complemented and much detail is preserved.

Pose Estimation and Data Recoupling

It has been shown that even the low-cost, low-precision inertial measurement units (IMUs) can significantly improve the performance on the attitude estimation for visual odometry system. To simplify the estimation process, we propose to fuse the inertial measurements from the AHRS by loosely coupled methods. As described above, the AHRS comprises sensors on three axes and may be equipped with on-board processing unit to provide reliable attitude information. Since the gyroscope and acceleration biases of the IMU are complemented in the AHRS system, the state vector is only composed of the sensor position $t \in \mathbb{R}^3$ in the inertial world frame, its velocity $v_w \in \mathbb{R}^3$ and attitude represented by quaternion $q_w$. This yields a 10-element state vector $X=[q_w^T, t^T, v_w^T]^T$ and a simple kinetic model can be established.

To approximate the estimated translational covariance on the axonometric plane, we need to further explore the correlation output $\Psi^{-1}(g(x))$. Intuitively, the value of each element $\Psi_{[i,j]}^{-1}(g(x))$ indicates the estimated confidence of the corresponding image translation (i, j). Hence the estimated covariance can be found by calculating the covariance of weighted relative translation to the peak. However, its complexity is O(n). To reduce the computational requirements, we assume that the normalized correlation output $\Psi^{-1}(g(x))/\Sigma g(x)$ is a 2-D Gaussian mask with the center on the peak. Since the peak value of a 2-D Gaussian function is $1/(2\pi\sigma_i\sigma_j)$ where $\sigma_i$, $\sigma_j$ are the standard deviation, the estimated covariance $\sigma_{p[0]}^2$, $\sigma_{p[1]}^2$ in the axonometric plane can be approximated with complexity O(1):

$$\sigma_{P[0]}^2 = \sigma_{P[1]}^2 = \frac{r_k^2 \cdot \sum g(x)}{2\pi \cdot \max g_{[i]}(x)}$$

where the maximum value of $g_{[i]}(x)$ has already been calculated and $r_k$ is the projection resolution defined in Algorithm 1. Note that we do not need to calculate the summation $\Sigma g(x)$ in complexity O(n), since the mean value of the side-lobe $\mu_s$ is calculated so that $\Sigma g(x)=(n-1)\mu_s+\max g_{[i]}(x)$.

Figure 8A:
FIGS. 8a to 8d show examples of correlation output from a sequence of three dimensional point cloud data frames.
Figure 8B:
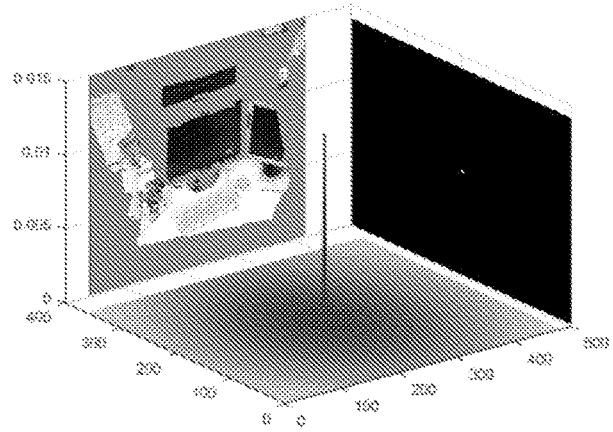
Figure 8C:
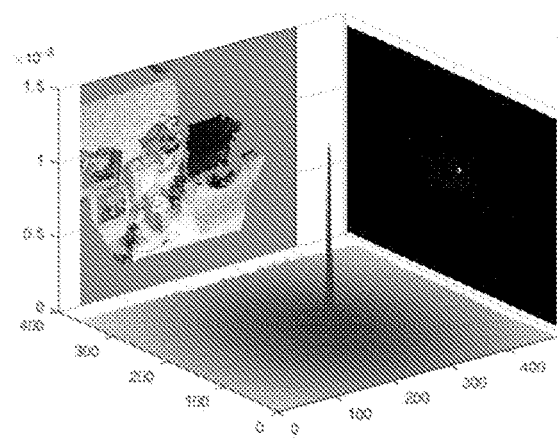
Figure 8D:
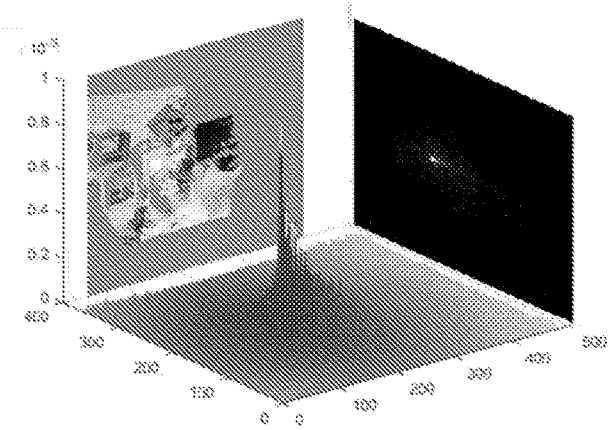

FIGS. 8a to 8d show examples of correlation output from a sequence. FIG. 8a is the first key-frame, FIG. 8b is the $10^{th}$ frame, FIG. 8c is the $43^{rd}$ frame and FIG. 8d is the $488^{th}$ frame. The correlation outputs are shown in the top-right of the corresponding figures whose PSR is 161, 71 and 41 respectively. For better visualization, the outputs are normalized and shown in 3-D space. We find that they can be approximated by a 2-D Gaussian function with the centre on the peak. This assumption is used for fast computing the estimated covariance.

The examples presented in FIG. 8 show that the correlation output may be approximated by a Gaussian mask especially when $P_{sr}(x)>20$, since $T_M>T_K>20$, this approximation can be safely used. The estimated variance in depth translation can be obtained through direct calculation:

$$\sigma_{P[2]}^2 = \underset{i \in W}{\text{Var}}(\mathcal{S}_{(-\tilde{m})}(x_{[i]}^D) - z_{[i]}^D)$$

where W is a point set which is defined above. Since the estimation in the three translational sub-spaces are decoupled and assumed to be independent, the translation covariance $u_p$ is a diagonal matrix and $\sigma_p = \text{diag}(\sigma_{p[0]}^2, \sigma_{p[1]}^2, \sigma_{p[2]}^2)$. Now based on the simple Kalman filter, we are able to recouple the movements to the original 3-D space. Bounded by the procedure of key-frame training and translation estimation, the overall complexity for the whole framework is O(n log n).

As described above embodiments of the present invention consisting of a set of algorithms to decrease the computational requirements for the front-end of SLAM systems have been developed. They compose the basic components of the proposed non-iterative framework.

Experimental Results

In the following section we evaluate the systems described above both quantitatively and qualitatively in terms of trajectory estimation, runtime efficiency and dense mapping in extreme conditions such as fast motion, dynamic scenes and featureless environments.

In all the experiments, the standard deviation of the Gaussian kernel is set as 0:2 pixels. The regularization term in the solutions, the matching difference threshold $T_c$ and $T_d$ for color and depth images are all set as 0.1. In experiments, we found these parameters are not sensitive to the test environments, since different scenarios and sensors are tested and the results are not much affected by different choices of these parameters. The PSR thresholds for creating new key-frame $T_K$ and the condition for map fusion $T_M$ are set as 50 and 100 respectively.

Figure 9:
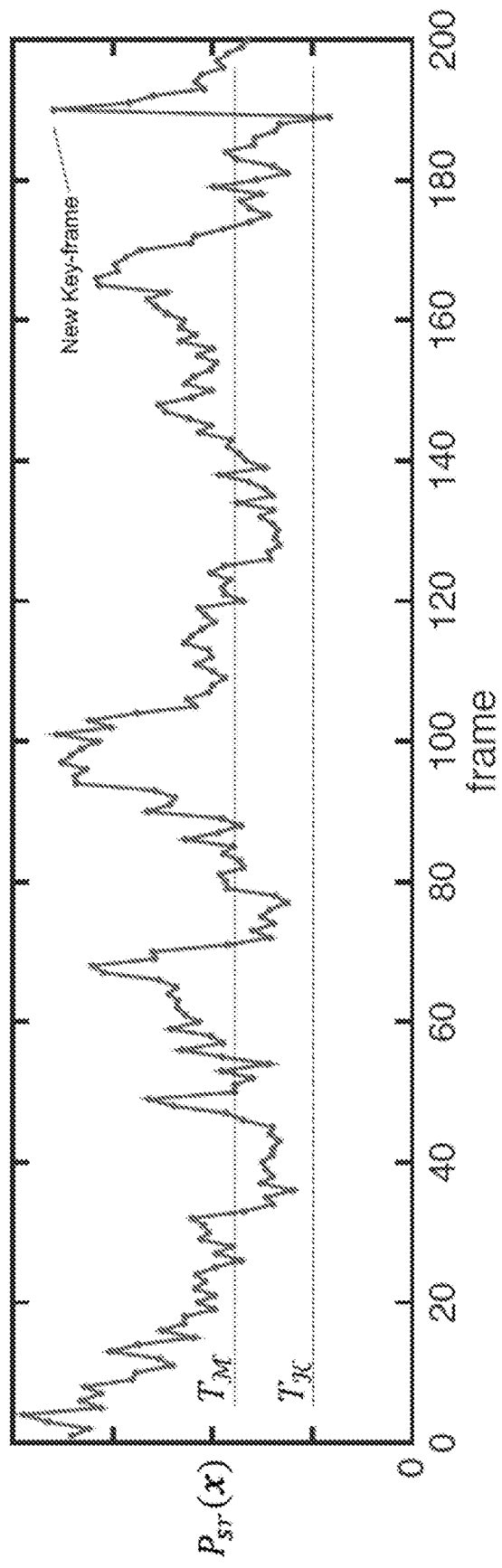
FIG. 9 illustrates the process of selecting a new key frame based on the peak to side lobe ratio (PSR) value in an embodiment of the present invention.

FIG. 9 illustrates the process of selecting a new key frame based on the PSR value in an embodiment of the present invention. As shown in FIG. 8, only when the PSR of the correlation output goes below $T_K$, a new key-frame will be selected. The point clouds will be fused with the key-frames when PSR is higher than $T_M$.

To test the performance of the proposed framework for micro-robots on ultra-low power processors and compare with the state-of-the-art algorithms, we will use two different platforms. One is the credit card sized UpBoard® that is equipped with an ultra-low power mobile-phone-level processor Atom x5-Z8350 with Scenario Design Power 2W. Running at 1:44 GHz with 2G RAM, this platform is very difficult for most of the state-of-the-art algorithms to run in real-time. Therefore, for comparison and visualization purpose, we also test our framework on a standard PC running Ubuntu 16.04 with an Intel Core i7-4700 CPU and 8G RAM. Limited by the payloads and power consumption, we choose Intel RealSense® camera to work with the UpBoard® and Microsoft Kinect® to work with the standard PC.

Real-time trajectory estimation using depth camera is demonstrated and compared with the state-of-the-art methods, RGB-D SLAM, ElasticFusion and ORBSLAM2 (RGB-D version). All the reported performances are based on their open source implementation on the robot operating system (ROS) and compared in terms of the root mean squared error (RMSE), absolute mean error (MEAN) and median absolute error (MAE). Since ElasticFusion does not provide ROS interface, we implement a ROS wrapper to receive images through ROS communication protocol. Some of the above methods have a requirement to finalize the state estimation after the process is terminated, while this is not suitable for low-latency robotic systems. To evaluate and compare their real-time performance, we only accept the instant pose estimation from all the above methods.

The experiment datasets were recorded in an indoor environment equipped with a high accurate Vicon motion capture system which serves to provide ground truth. Different traveling distances, speeds, dynamics and illumination conditions are covered. Except for the 6 DoF ground truth, the data include raw measurements from the RGB-D camera at 30 Hz, inertial measurements at 100 Hz from myAHRS+1 which is a low cost high performance AHRS containing a 16-bit 3-axis gyroscope, a 16-bit 3-axis accelerometer and a 13-bit 3-axis magnetometer.

FIG. 10 is a table showing a real-time accuracy comparison on the Kinect dataset with PC platform. Bold texts and texts with underscore indicate the best two performances. '-' indicates that method cannot produce an estimation for whole trajectory.

As can be seen in FIG. 10, NI-SLAM achieves good performance on the PC platform. We notice that the accuracy of feature-based methods, ORB-SLAM2 and RGB-D SLAM2 vary a lot in different datasets, this may be due to the existence of specular reflection and features-less regions. This phenomenon indicates that the feature-based methods are quite sensitive to feature outliers. It can be seen that ElasticFusion and ours (a system implementing the methods described herein) have similar pose estimation error for different datasets. However, the ICP-based method ElasticFusion requires powerful GPU, while our method is based on GKCF that is very fast and robust to object distortion and occlusion.

The corresponding performance of efficiency is given in FIG. 11. For RGB-D SLAM2, it is noticed that the real-time pose estimation performance fluctuates much more than its off-line performance, which is also given for comparison. Note that except for ORB-SLAM2 (RGB-D version), all the other methods are able to produce and fuse dense maps.

FIG. 11 shows that the proposed framework outperforms all the other methods in terms of running time (update rate). Note that the running time of our method reported in FIG. 11 contains the summation of both tracking and mapping; while that of the other methods only contain the tracking time. This is because the implementation of tracking thread is independent of the local mapping in other methods, while they are processed sequentially in ours with one thread, although they can also be implemented in parallel. The running time varies for different datasets according to the number of trainings. If landmarks change rapidly, our method has to train new targets and thus increases a little bit of running time. For ElasticFusion, the reported accuracy is obtained from slowing down the process of sending images 6 times to make sure that there is no dropping frames. We note the high accuracy performance of ORB-SLAM2 (RGB-D version) in some situations. ORB-SLAM is implemented as a full SLAM system with loop closure detection, while our method is an odometry system for which drift is inevitable. Due to this reason, we found that the accuracy performance of ORB-SLAM is better when visual loop closure is available frequently, and is good at tracking the environments with lots of visual features. However, we have shown that, the accuracy of such feature-based methods will drop dramatically in feature-less and pseudo-feature environments. While our GKCF-based method is robust to object distortion and occlusion. In this sense, the proposed noniterative framework provides a new solution for the frontend (data association) of visual SLAM system, that works well in environments for which traditional methods is not suitable. Similar to ORB-SLAM and also other methods, we can integrate off-the-shelf algorithms such as DBoW2 and OpenFabMap to detect visual loop and to close the loop by G2O.

FIG. 12 is a table showing Average runtime (ms) of tracking and mapping on an ultra-low power platform UpBoard® for RGB-D image size 640×480. For ORB-SLAM2, the mapping process is independent with tracking.

It has been shown that NI-SLAM requires the least computational resources. Experiments on the Up-Board® also show that it is the only one that can run on such ultra low power platforms in real-time (about 30 Hz update rate). The average running time of tracking and mapping are listed respectively in FIG. 12, where that of ORB-SLAM2 is also given for comparison. It should be noted that ORB-SLAM2 cannot produce and fuse dense maps, while our method takes tracking and dense mapping into one thread and still able to run in real-time. To the best of our knowledge, the proposed method takes dense mapping to the power-weight-limited micro-robot systems for the first time.

FIG. 13 shows a real-time accuracy comparison on the stereo cameras. The corresponding efficiency performance is given in FIG. 14. Compared with RGB-D cameras, stereo cameras have customized baseline and are insensitive to object materials, but generally produce more depth noises, especially in featureless regions. To show the generality and robustness, performance on stereo camera is demonstrated in this section. For comparison, the state-of-the-art visual inertial odometry system using stereo cameras, OKVIS is implemented on the same platform mentioned above. Experimental data is recorded in the same Vicon room using the commercial stereo camera ZED with the inertial sensor myAHRS+, whose installation parameters are obtained from the open source multi-sensor calibration package Kalibr. Based on the software development kit (SDK) of ZED, we are able to obtain stereo images with size 672×376 and 3-D point clouds at 30 Hz in ROS. FIG. 13 presents the estimation error where our method shows comparable accuracy compared with OKVIS.

FIG. 14 shows average running time (ms) on PC platform using stereo cameras corresponding to the results presented in FIG. 13. It is noted that the proposed method requires much less running time than OKVIS in all the datasets. Note that OKVIS is based on non-linear optimization and is implemented highly parallel. Hence, the reported data of OKVIS in FIG. 14 only indicates the running time of that function in each iteration, while they cannot be summed up simply.

Performance in stressful environmental conditions indicates the degree to which a system can function correctly. For a SLAM system, one of the most challenging scenes is the shaking of sensors that is caused by the robots' fast motion or motor vibration. To test the robustness of the proposed framework, this section presents the qualitative performance under the condition of fast shaking. To simplify the test procedure, a sensor module including a depth camera and an AHRS is shaken by human hands for 5 times with each lasting for 30 seconds. The number of tracking failures is counted to indicate the system robustness. For a comparison, a commercial Tango-enabled tablet computer from Google® is bound together with this sensor module. A Tango-enabled device is an Android device that integrates a wide-angle camera, a depth sensing camera, an IMU sensor, GPS, accurate sensor time-stamping and a software stack that enables motion tracking, depth sensing, etc. This tablet is equipped with a NVIDIA® Tegra K1 GPU with 192 CUDA cores supplied by 4 GB of RAM. The number of tracking failures can be easily acquired from the screen. In this test, we found that our method can keep tracking fast shaking motion all the time, while Google's Tango enabled tablet loses tracking in such case. In this sense, our proposed framework is able to work in more challenging environments and robust to fast motion.

Whilst the foregoing description has described exemplary embodiments, it will be understood by those skilled in the art that many variations of the embodiments can be made within the scope and spirit of the present invention.

The invention claimed is:

1. A simultaneous localization and mapping method comprising:
   receiving a frame of three dimensional point cloud data from a three dimensional point cloud sensor coupled to a robot;
   receiving inertial measurement data indicative of a change in pose of the three dimensional point cloud sensor;

using the inertial measurement data to estimate a rotation between a received frame of three dimensional point cloud data and a key frame of three dimensional point cloud data;

applying a rotation to the received frame of three dimensional point cloud data to obtain an aligned frame of three dimensional point cloud data, the aligned frame of three dimensional point cloud data having an orientation aligned with the key frame of three dimensional point cloud data;

estimating a three dimensional translation in position of the robot by estimating a translation of the aligned frame of three dimensional point cloud data from the key frame of three dimensional point cloud data; and localizing or navigating the robot by using the estimated three dimensional translation.

2. A method according to claim 1, further comprising applying an axonometric projection to the aligned frame of three dimensional point cloud data to obtain axonometric image frame data and wherein estimating the translation of the aligned frame of three dimensional point cloud data from the key frame of three dimensional point cloud data comprises estimating a translation of the axonometric image frame data in an axonometric image plane.

3. A method according to claim 2, further comprising expanding the axonometric image frame data into a one-dimensional vector and wherein estimating a translation of the axonometric image frame data in an axonometric image plane comprises determining a cyclic shift of the one-dimensional vector.

4. A method according to claim 1, wherein estimating a translation of the aligned frame of three dimensional point cloud data from the key frame of three dimensional point cloud data comprises applying a correlation filter.

5. A method according to claim 4, wherein the correlation filter is a general kernelized correlation filter and/or a kernelized correlation filter.

6. A method according to claim 1, further comprising creating a new key frame if a matching criterion is below a first threshold.

7. A method according to claim 6, further comprising key frame refinement using the aligned frame of three dimensional point cloud data if the matching criterion is above a second threshold.

8. A method according to claim 7 wherein the second threshold is greater than the first threshold.

9. A method according to claim 6, wherein the matching criterion is a peak to side-lobe ratio.

10. A method according to claim 1, further comprising refining the key frame using the aligned frame of three dimensional point cloud data.

11. A simultaneous localization and mapping system comprising:
a three dimensional point cloud sensor;
an inertial sensor; and
a processing module configured to:
receive a frame of three dimensional point cloud data from the three dimensional point cloud sensor coupled to a robot;
receive inertial measurement data indicative of a change in pose of the three dimensional point cloud sensor;
use the inertial measurement data to estimate a rotation between a received frame of three dimensional point cloud data and a key frame of three dimensional point cloud data;
apply a rotation to the received frame of three dimensional point cloud data to obtain an aligned frame of three dimensional point cloud data, the aligned frame of three dimensional point cloud data having an orientation aligned with the key frame of three dimensional point cloud data; and
estimate a three dimensional translation in position of the robot by estimating a translation of the aligned frame of three dimensional point cloud data from the key frame of three dimensional point cloud data in order for the robot to localize and navigate.

12. A system according to claim 11, wherein the three dimensional point cloud sensor is a RGB-D camera, and/or a Stereo Camera and/or a 3D laser scanner.

13. A system according to claim 11, wherein the processing module is further configured to apply an axonometric projection to the aligned frame of three dimensional point cloud data to obtain axonometric image frame data and wherein the translation of the aligned frame of three dimensional point cloud data from the key frame of three dimensional point cloud data is estimated by a translation of the axonometric image frame data in an axonometric image plane.

14. A system according to claim 13, wherein the processing module is further operable to expand the axonometric image frame data into a one-dimensional vector and wherein the translation of the axonometric image frame data in an axonometric image plane is estimated by determining a cyclic shift of the one-dimensional vector.

15. A system according to claim 11, wherein the processing module is further configured to estimate the translation of the aligned frame of three dimensional point cloud data from the key frame of three dimensional point cloud data by applying a correlation filter.

16. A system according to claim 15 wherein the correlation filter is a general kernelized correlation filter and/or a kernelized correlation filter.

17. A system according to claim 11, wherein the processing module is further configured to create a new key frame if a matching criterion is below a first threshold.

18. A system according to any claim 17, wherein the processing module is further configured to refine the key frame using the aligned frame of three dimensional point cloud data if the matching criterion is above a second threshold.

19. A system according to claim 17, wherein the matching criterion is a peak to side-lobe ratio.

20. A system according to claim 11, wherein the processing module is further configured to refine the key frame using the aligned frame of three dimensional point cloud data.

* * * * *